Patented Nov. 5, 1929

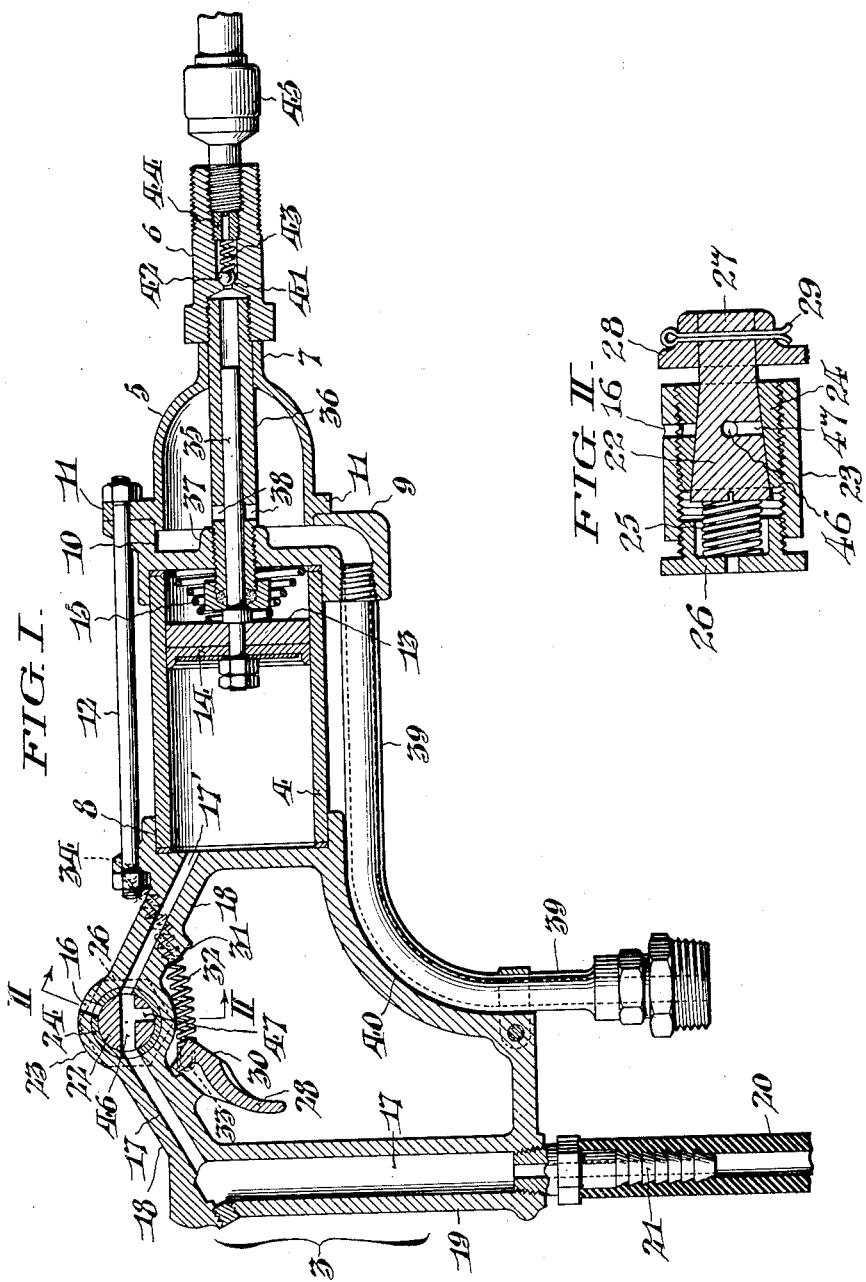

1,734,368

UNITED STATES PATENT OFFICE

ARTHUR B. CUMNER, OF NEW YORK, N. Y.

FLUID GUN

Application filed October 25, 1927. Serial No. 228,550.

This invention relates to fluid or grease guns useful, for example, in connection with systems for lubricating the various bearings associated with the running gear of automobiles; and, more specifically speaking, it is concerned with grease guns particularly adapted to automobile service stations.

In the generality of power-operated one-man outfits commonly in use they all multiply the pressure on the lubricant on the "dolly" and transmit the lubricant at the high pressure—usually ranging from 2000 lbs. to 5000 lbs. per square inch—through flexible tubing averaging five feet in length. Flexible tubing having to carry such high pressures is invariably short lived, while the use of solid tubing incorporating flexible joints is objectionable in that such joints are decidedly limited in angle of operation and consequently easily broken.

My present invention has for its primary object to provide a fluid gun in which the high pressure is developed closely proximate to, or right at, the point of extrusion directly into the bearing or oil ducts to be cleansed; or, in other words, I fundamentally aim to eliminate the necessity for use of lengthy conductive means, intermediate the gun and point of application, that has heretofore been subject to pressure tending to disrupt the same or create leaks at the joints therein.

My present invention is further directed toward affording a structurally simple and easily operable fluid or grease gun capable of utilizing compressed air—or any other suitable pressure medium—in determining successive delivery of measured charges of the lubricant at pressures sufficiently high to overcome the resistance of, and to displace, any clogging matter likely to be held by rust or otherwise in the ducts of bearings being oiled.

Still further, I aim to provide a grease gun incorporating a trigger-controlled taper-plug valve with only a single air passage, and in utilizing a portion of said passage for both intake and exhaust purposes.

Other objects and advantages of this invention will be apparent from the detailed description which follows of the typical embodiment shown in the accompanying drawings; while the subjoined claims serve to define the features of novelty.

In the drawings:—

Fig. I is a longitudinal section illustrative of the device, with the control valve shown in the operative position, as later on explained; and, Fig. II is a detail section taken locally, as indicated by the arrows II—II in Fig. I.

From these illustrations, it will be seen that the device is suitably configured for ease in grasping, and embodies a part 3 simulating the stock of a gun, together with a laterally-projecting barrel portion comprising a cylinder 4, and an axially-aligned dome-like section 5 having an applicator nipple 6 forming an extension of the diametrically reduced forward neck portion 7 of said section 5. The inner end of the cylinder 4 is received within a recess 8 in the stock 3, while its forward end is closed by a cap-like fitting 9, which is circumferentially extended at 10 to afford a seat for a projecting base flange 11 on the dome section 5, the several parts aforesaid being secured together by a number of longitudinally-disposed tie-bolts 12, one only being visible in the drawings.

Within the cylinder 4 is a piston 13, fitted with a renewable cup gasket 14, which is under the influence of a helical spring 15, that serves to move said piston from the position shown, by virtue of a relief port 16 in the stock 3, as later on set forth. Fluid pressure medium (preferably compressed air) for actuating the piston 13 is conducted to the cylinder 4 via a duct 17 that extends axially through the bridging portion or obtuse-angled arch section 18 of the stock 3, and downward through the vertical or grasp portion 19 of said stock to the bottom end of the latter where a supply pipe is connected through the medium of a conventional attaching nipple 21; all as clearly shown in Fig. I. Exhaust from the cylinder 4 is by way of the forward portion 17' of the duct 17 and relief port 16, when the control valve 22 is released; as hereafter explained. Actuation of the piston 13 is effected by the control valve 22 just referred to, and it will be noted the same is of the three-way taper-plug variety. To this end, the bridging portion 18 of the stock 3, is medially enlarged at 23 and bored to receive a screw-threaded sleeve 24 that serves as a seat for the taper plug valve 22; said valve being frictionally influenced, by a spring 25 under compression, held thereagainst by a cupped cap 26 with capacity of adjustment, in an obvious manner.

The valve 22 is provided with an axial extension 27 to which a finger trigger 28 is keyed by means of a cotter-pin 29, and said trigger is normally held in a position with the heel portion 30 thereof abutting a flat 31— on the underside of the bridging section 18, under the action of a retractile spring 32, conveniently hooked to the trigger at 33 at one end and to a screw 34 threaded into the perimetric surface of the stock about the cylinder and receiving recess 8, hereinbefore referred to.

Referring again to the piston 13 it will be noted that the same is secured to a rod 35 operating as a plunger within a tube 36 which is passed through the diametrically-reduced neck 7 of the dome-section 5 and screwed into a central boss 37 of the cap-like fitting 9. The tube 36 is in communication with the hollow of the dome-section 5 through radial ports 38 for capacity to receive fluid or semi-fluid lubricant conducted to the device under pressure from a suitable source of supply, not shown, through a pipe 39. This pipe 39 follows the rounded portion 40 of the stock 3 and takes into the inner side of the fitting 9, as shown in Fig. I. The outer end of the tube 36 projects somewhat beyond the neck 7 of the section 5 and is screw-threaded to take the nipple 6. On its interior, the nipple 6 provides a seat 41 for a ball valve 42 that is urged inward by a spring 43 whereof the pressure is adjustable by means of a screw sleeve 44 threaded axially into said nipple, and the adjustment fixable by direct application of a standardized flexible adapter coupling 45 of the kind ordinarily used in this art. Attention is drawn to the internal and external screw-threading of the outer end of the nipple 6, whereby the device may be directly applied to suitable parts needing purging and lubrication, as well as the convenience afforded for attachment of different sized adapters 45.

Attention is again directed to the three-way taper-plug control valve 22, which is provided with a diametric passage 46, and a port 47 at right angles thereto but slightly offset relative to the axis of said valve, as clearly seen in Fig. I. It is to be further noted that when the parts are in the operative position shown that the passage 46 in the plug valve 22 affords free communication by way of the duct 17—17', and that the relief port 16 is closed. On the other hand, when the trigger 28 is released, the offset port 47 is turned into alignment with the duct section 17', with the immediately proximate—or shorter—portion of the passage 46 open to the relief 16, and the duct 17 shut-off.

In operation, the return stroke of the plunger rod 33 under the action of the spring 15 influencing the piston 13, creates a vacuum in the tube 36 thereby facilitating flow thereinto, through the radial ports 38, of the lubricant conducted to the dome-section 5, under pressure, by way of the supply pipe 39. The tube 36 thus acts as a measuring chamber to set apart, at each actuation of the trigger 28 and plunger rod 35, a fixed quantity or charge of the lubricant. With the tube 36 now full, the trigger 28 is pulled to the illustrated position, of Fig. I, thereby imparting a substantially quarter turn to the taper plug valve 22, which is attended by closing of the relief port 16 and establishment of direct communication between the pressure fluid supply pipe 20 and the cylinder 4, via the duct 17—17'. As a result, the piston 13 is advanced, to the position shown, in opposition to the associated spring 15, while the plunger rod 35 is carried forward to displace the charge of lubricant from the tube 36 past the ball valve 42 and to expel such charge through the nipple 6 and adapter attachment 45. Now, it will be noted that by virtue of the very great difference in the areas of the piston 13 and the plunger rod 35, the pressure of extrusion is correspondingly multiplied. With the parts proportioned and assembled approximately as shown, it is possible to secure, with compressed air at pressures ordinarily available in service station equipment, delivery of lubricant with ample force at the point of application to insure dislodgment of any clogging matter tending to resist penetration of the bearings being oiled.

As a consequence of provision of the finger trigger 28 and taper plug control valve 22, it will be apparent my novel grease gun is manipulated with the greatest ease, while said device may be readily taken apart either for periodic cleaning or replacement of any worn parts, when required, after extensive use in practice.

Although I have described my invention as particularly useful for dispensing lubricating oil or grease, it may be employed, with equal advantages in handling of other liquid or semi-solid substances.

Having thus described my invention I claim:

1. In a fluid gun comprising a dome-section chamber having an intercommunicating axial tube for receiving and measuring a definite charge of the fluid, a plunger operating in said tube, an axially aligned actuating cylinder connected to the aforesaid chamber, and a spring return piston in said cylinder of considerably greater area than the plunger and direct connected thereto, the combination of a stock having an inlet duct through which fluent motive medium is conducted to the actuating cylinder, said duct including an arched portion having a medially positioned enlargement with the forward section of said duct serving as an exhaust outlet, and a trigger actuable taper plug valve seating in said enlargement to control flow and exhaust of motive-medium therethrough.

2. In a fluid gun of the type described, the combination of a stock member having a pressure medium inlet duct including an angularly arched portion with a medially positioned intersecting enlargement, one part of said arched portion serving both as a flow inlet and exhaust connection from an actuating cylinder clamped to said stock and having a spring return piston with an axial plunger, a trigger-actuable taper-plug three-way valve seating in the enlargement aforesaid, and a dome-section with a concentric interconnecting tube—for receiving and measuring fluid—axially aligned with and attached to the actuating cylinder and under control of the plunger aforesaid, whereby a fixed quantity of the fluid charge is expelled under multiplied pressure at each actuation of the gun.

3. In a fluid gun of the type described, the combination of a stock member having a pressure-medium inlet duct including an obtuse-angled section with a medially positioned intersecting enlargement, the forward half of said section serving both as a flow inlet and exhaust outlet from an actuating cylinder clamped to said stock and having a spring return piston with an axial plunger, a spring influenced trigger-actuable three-way valve seating in the enlargement aforesaid by aid of a removable sleeve, and a fluid-receiving dome including an axial measuring tube connecting with said chamber by radial ports, said measuring tube being controlled by the plunger aforesaid to effect expulsion of a fixed fluid charge under multiplied pressure with each actuation of the gun.

4. In a fluid gun of the type described, the combination of a stock member having a pressure-medium inlet duct including an obtuse-angled section with an intersecting enlargement at the angular point thereof, the forward half of said section serving both as a flow-inlet and exhaust outlet from an actuating cylinder clamped to said stock and having a spring return piston with an axial plunger, a removable sleeve in the enlargement aforesaid providing a seat for a taper-plug three-way valve, a cupped-cap and spring adjustable to maintain said valve frictionally seated, a spring influenced trigger for imparting a substantially quarter turn to the valve, and a fluid-receiving dome including an axial measuring tube connecting with said chamber by radial ports, for the purpose specified.

In testimony whereof I have hereunto signed my name at New York, New York, this 22d day of October, 1927.

ARTHUR B. CUMNER.